July 17, 1934.    J. L. PERKINS ET AL    1,966,732
DOUGH SLICING APPARATUS
Filed Oct. 26, 1932    3 Sheets-Sheet 3
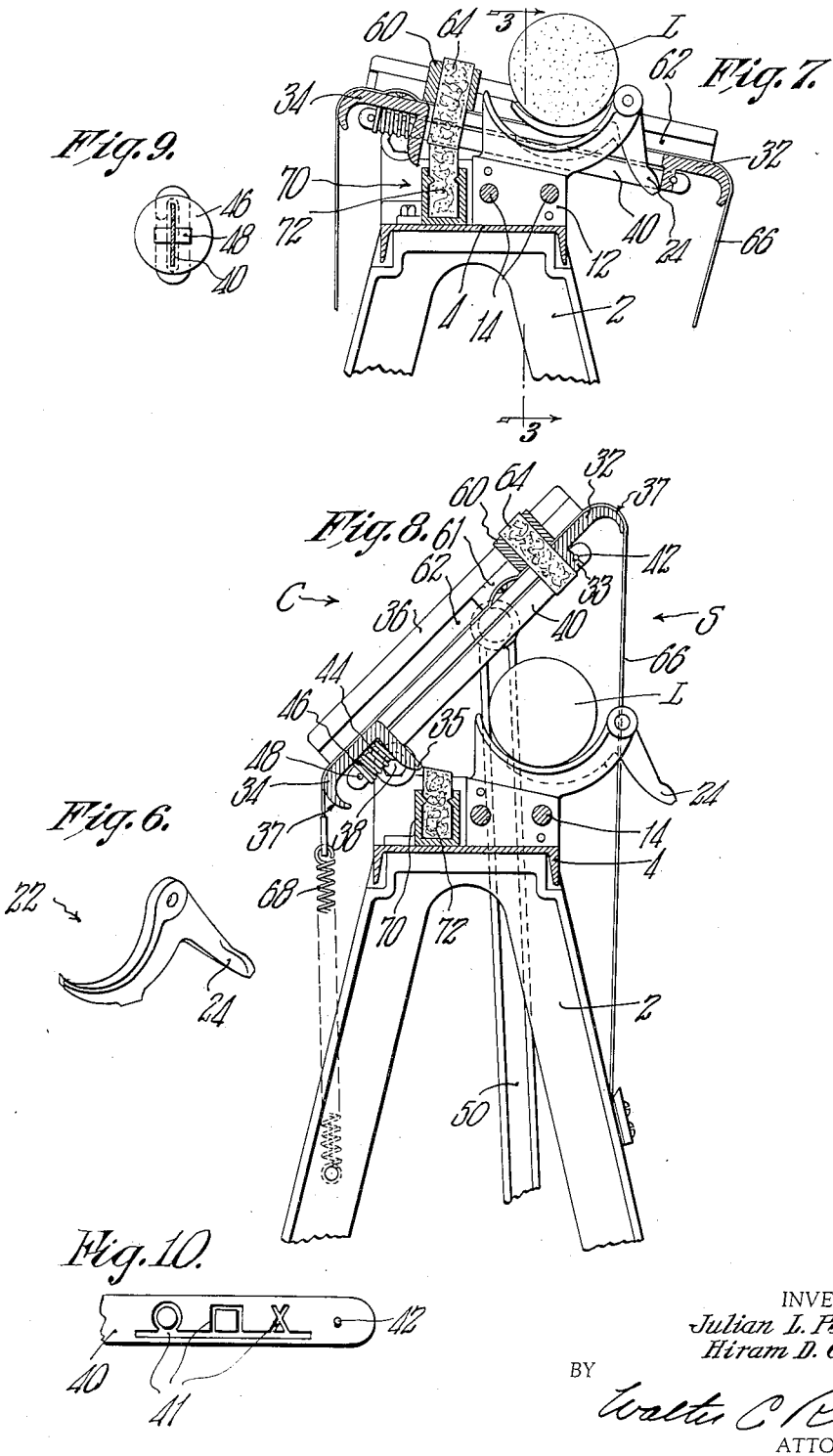
INVENTORS,
Julian L. Perkins,
Hiram D. Croft,
BY
Walter C Ross
ATTORNEY.

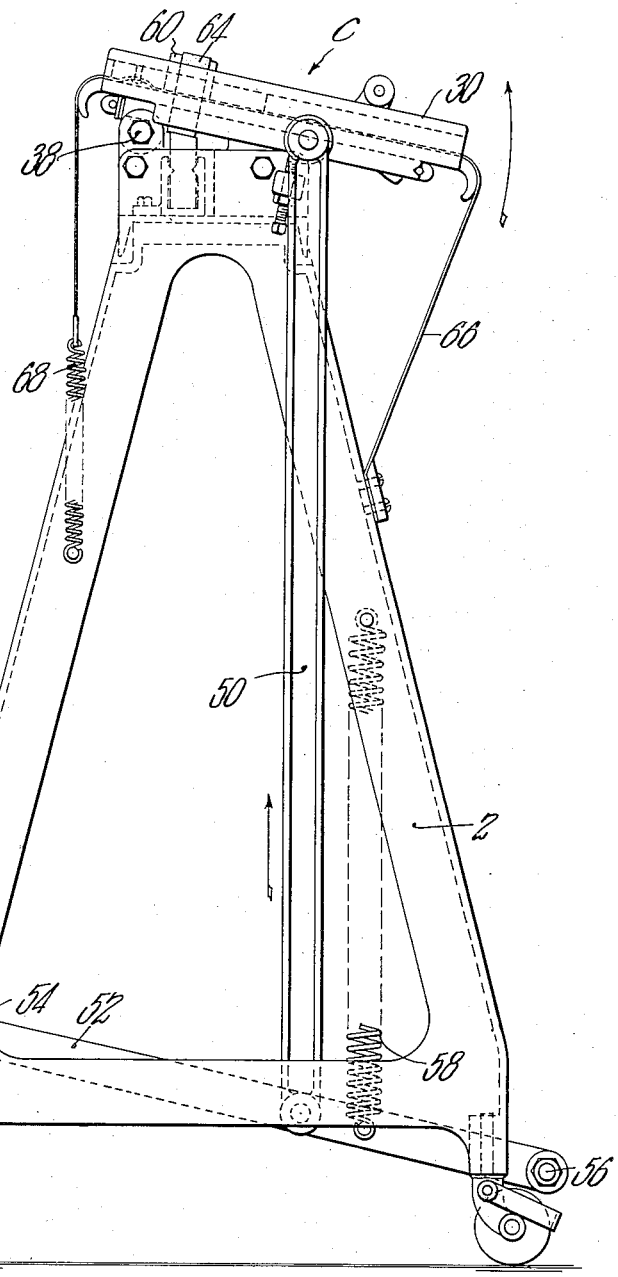

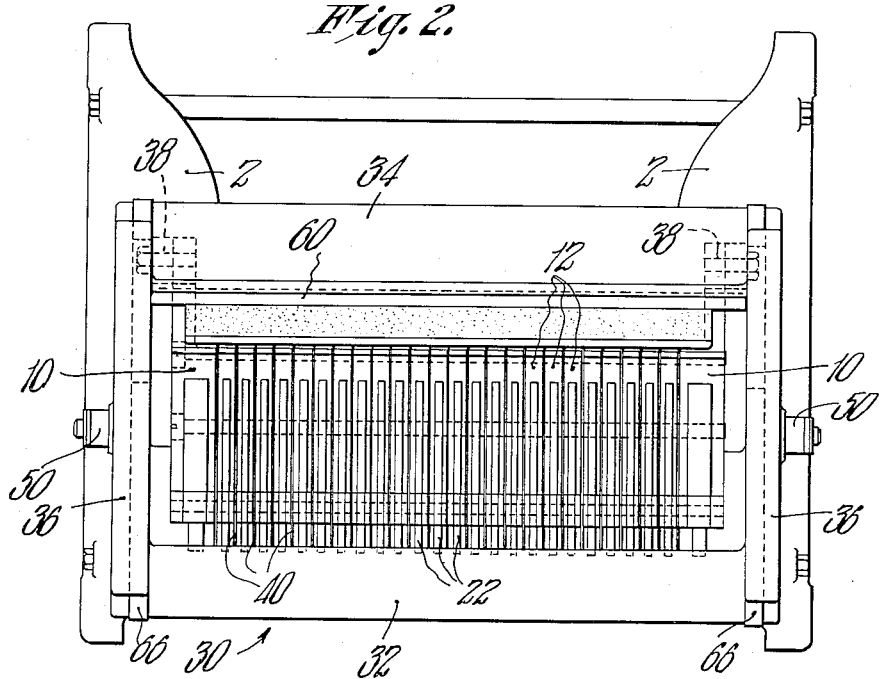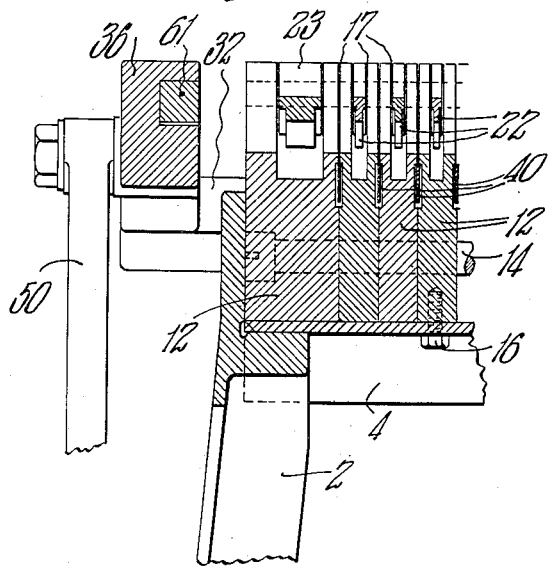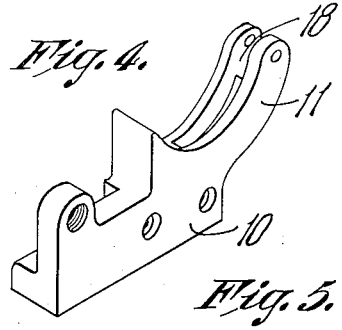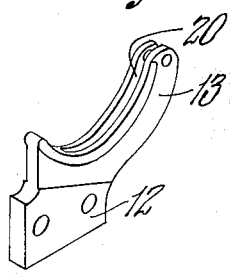

Patented July 17, 1934

1,966,732

UNITED STATES PATENT OFFICE 1,966,732

DOUGH SLICING APPARATUS

Julian L. Perkins, West Springfield, and Hiram D. Croft, Springfield, Mass., assignors to Perkins Machine & Gear Company, West Springfield, Mass., a corporation of Massachusetts Application October 26, 1932, Serial No. 639,640

11 Claims. (Cl. 107—21)

This invention relates to improvements in machines or apparatus for slicing or dividing a body into separate pieces or slices.

A machine embodying the features of the invention is particularly adapted for slicing or dividing unbaked loaves of bread dough or the like so that when the dough is baked, slices or pieces of bread may be easily and readily removed from the loaf.

According to one novel feature of the invention, a support for a body of material such as unbaked dough is provided which is slotted to receive a plurality of spaced cutters which are movable relative to the support while means are provided for applying lubricant to the cutters which is preferably brought into operation for each cutting operation.

According to another feature of the invention means is provided for ejecting the sliced body which operates after each cutting operation.

Various other objects and novel features of the invention will be more fully hereinafter referred to in connection with the accompanying drawings, reference being had to the accompanying drawings, wherein;

Fig. 1 is an end elevational view of a machine embodying the features of the invention.

Fig. 2 is a plan view of the same.

Fig. 3 is a sectional elevational view on the line 3—3 of Fig. 7.

Fig. 4 is a perspective view of an end member of the body support.

Fig. 5 is a similar view of an intermediate member thereof.

Fig. 6 is a perspective view of one of the ejector units of the machine.

Fig. 7 is a transverse sectional view through the body support and cutting mechanism.

Fig. 8 is a similar view with the parts in a different relative position.

Fig. 9 is an end view of one of the cutters or knives, and

Fig. 10 is an elevational view of portions of one of the cutters.

Referring now to the drawings in detail the invention will be fully described.

A frame for the machine may comprise supporting legs 2 and a top plate or bed 4 suitably joined thereto. A body supporting structure indicated generally by S is carried by the bed and a cutter structure C is located adjacent thereto. These are movable relative to one another so the cutter knives will pass through the body support all as will appear.

The support S preferably consists of end members 10 shown in Fig. 4 and similar intermediate members 12 shown in Fig. 5. These are arranged side by side and are held together by tie members such as bolts 14 so as to constitute a supporting structure which may be fastened to the bed 4 by bolts such as 16, (see Fig. 3).

The upper sides of the members 10 and 12 are preferably curved as shown to provide a body supporting surface. The members 10 and 12 are of less width at their upper sides than at their lower sides so as to provide slots 17 therebetween (see Fig. 3). The upper ends 11 and 13 of the members 10 and 12 are slotted at 18 and 20 (see Figs. 4 and 5).

Ejecting levers 22 shown in Fig. 6 are pivoted in the slots 18 and 20 of the support members 10 and 12 and these, as shown, have curved upper surfaces and depending arms 24. The slots 18 of members 11 are wider than those of members 12 so that ejecting levers such as 23 in the slots 18 may be relatively wider than those in slots 20.

The cutter mechanism C consists of a frame like member 30 having forward and rear rails 32 and 34 and end rails 36 which are suitably joined together. The rear corners of the frame are pivoted at 38 to the end support members 10 so the frame may swing relative to the support.

A plurality of relatively thin cutters or knives 40 are associated with the frame. Their opposite ends are receivable in suitable slots in flanges 33 and 35 of the forward and rear frame members 32 and 34. Pins such as 42 in the outer ends of the knives are receivable in such grooves or depressions shown in the flange 33. Springs 44 surround the cutters at their other ends and washers 46 over the springs abut pins 48 in the cutters (see Fig. 8). This is so the springs yieldingly hold the cutters in place to facilitate their ready and easy removal from the frame or insertion thereinto.

A pair of links 50 are pivotally connected at their upper ends to the cutter frame 30 and at lower ends to levers 52 pivoted at 54 to the supports 2. These levers 52 are connected at their outer ends by a cross rod 56. Spring 58 connected between the levers 52 and supports 2 are arranged to urge the levers 52 towards an upper position.

In operation an operator places a body such as a loaf of unbaked dough L on the support S and then presses on the bar 56 with the foot to depress the levers 52 and thereby move the frame so the cutters thereof pass through the loaf and slots of the support so as to divide or slice the loaf. As the cutter frame approaches its lower position the member 32 thereof brings up against the ejector arms 24 so as to swing them upwardly whereby they raise the sliced loaf upwardly. Then the operator may place his hands beneath the loaf to remove it. The foot is removed from the bar 56 and the spring or springs 58 return the parts to the upper position shown in Fig. 8.

Means to lubricate the knives is provided and will now be described.

A slide 60 has opposite end portions 61 slidable in grooves or slideways 62 of the frame members 36 and carries a lubricating member 64. This may be of yieldable material such as felt or the like adapted to hold or take on lubricating materials such as shortening, certain oils or the like and it may be slotted or formed to receive the knives 40 or have parts to drag along or bear on the knives.

A strap member 66 of flexible material has one end fastened to one support 2 and overlies opposite curved portions 37 of the frame parts 32 and 34. This strap is secured intermediate its ends in some suitable way to the slide, as shown, in Fig. 8. The other end of the member 66 is attached to a spring 68 and the spring is attached to the support 2 as shown in Fig. 8. There may be a strap and spring at either end of the cutter frame if desired.

The parts are arranged so that the slide is moved longitudinally of the knives from the position shown in Fig. 8 to the position shown in Fig. 7 as the frame swings downwardly for a cutting operation. In this way lubricant carried by the part 64 of the lubricator is applied to the knives for each cutting operation.

It will be noted that the lubricating means is operated as the cutter and support are moved relative to one another.

A reservoir 70 for supplying lubricant is carried by the table 4 and may consist of a receptacle as shown so that the member 64 or parts thereof may dip thereinto when the slide is in one position or it may carry a wick 72 or the like for contacting with the member 64 and, being saturated with lubricant, will supply the same to the member 64.

The knives 40 as shown in Fig. 10 may be provided with recesses for receiving lubricant. This may be accomplished by etching, engraving or cutting the sides of the blade with designs of various natures so as to form a plurality of recesses or pockets such as 41. As the lubricator traverses the blades, lubricant is received in the recesses whereby the blade is sure to have a supply of lubricant. In other ways the blades may be provided with recesses by drilling or other well known operations.

Having described the invention in the form at present preferred what it is desired to claim and secure by Letters Patent of the United States is:

1. A machine of the class described comprising in combination, a relatively movable support and cutter, the said support including a plurality of separate supporting members having adjacent edge portions in spaced relation to form slots therebetween, the said cutter including a plurality of knives receivable in said slots, a plurality of ejecting members associated with said support adapted to be engaged by the cutter and movable thereby into ejecting position, and lubricating means operable to lubricate said knives as the cutter and support are moved relative to one another.

2. A machine of the class described comprising in combination a cutter, a plurality of supporting members having their side edges in spaced relation to form slots therebetween and provided with slots intermediate said edges, ejectors in said last-named slots pivoted for swinging movements, the said cutter including a plurality of spaced knives receivable in said first-named slots and engageable with the ejectors as the cutter and support move relative to one another to actuate said ejectors.

3. A machine of the class described comprising in combination, a relatively movable support for an object to be cut and a cutter including a plurality of spaced knives, a lubricating device for said knives movable on said cutter to traverse said knives and supply lubricant thereto, and means to move the said device as the support and cutter are moved relative to one another.

4. A machine of the class described comprising in combination, a support and a cutter arranged for relatively swinging movements, said cutter including a plurality of spaced knives, a lubricator slidable in said cutter having parts for contacting with the sides of said knives, means to move said cutter and support relative to one another and means associated with the lubricator to move the lubricator as the cutter and support are moved relative to one another.

5. A machine of the class described comprising in combination, a support and a cutter arranged for relatively swinging movements, said cutter including a plurality of spaced knives, a lubricator slidable in said cutter having parts for contacting with the sides of said knives, means to move said cutter and support relative to one another, means associated with the lubricator to move the lubricator as the cutter and support are moved relative to one another, and means for supplying lubricant to the lubricator.

6. A machine of the class described comprising in combination, a support for an object, a cutter pivoted for swinging movements relative to said support including a plurality of spaced knives, a lubricator movable relative to said knives having parts to traverse said knives to supply lubricant thereto, and actuating means attached to said lubricator and to said support whereby the lubricator is moved relative to said knives as the cutter is swung relative to the support.

7. A machine of the class described comprising in combination, a support for an object, a cutter pivoted for swinging movements relative to said support including a plurality of spaced knives, a lubricator movable relative to said knives having parts to traverse said knives to supply lubricant thereto, actuating means attached to said lubricator and to said support whereby the lubricator is moved relative to said knives as the cutter is swung relative to the support, and ejectors pivoted on said support having parts engageable by said cutter whereby they are swung to ejecting position by said cutter.

8. A machine of the class described comprising in combination, a support for an object, a cutter pivoted for swinging movements relative to said support including a plurality of spaced knives, a lubricator movable relative to said knives having parts to traverse said knives to supply lubricant thereto, means for supplying lubricant to the lubricator, means for swinging said cutter, and actuating means attached to said lubricator and to said support whereby the lubricator is moved relative to said knives as the cutter is swung relative to the support, the said cutter including a frame having opposite side members in which the knives are removably secured.

9. A machine of the class described comprising in combination, a support for an object, a cutter pivoted for swinging movements relative to said support including a plurality of spaced knives, a lubricator movable relative to said knives having parts to traverse said knives to supply lubricant thereto, means for supplying lubricant to the lubricator, means for swinging said cutter, and actuating means attached to said lubricator and to said support whereby the lubricator is moved relative to said knives as the cutter is swung relative to the support, the said actuating means including a strap secured intermediate its ends to the lubricator and being yieldingly attached at one end to said support.

10. A machine of the class described comprising in combination, a support for an object, a cutter pivoted for swinging movements relative to said support including a plurality of spaced knives, a lubricator movable relative to said knives having parts to traverse said knives to supply lubricant thereto, and actuating means attached to said lubricator and to said support whereby the lubricator is moved relative to said knives as the cutter is swung relative to the support, the said cutter including end members and the said lubricator including a member having opposite ends slidable relative to said end members.

11. A machine for slicing a loaf of unbaked dough comprising in combination, a stationary support having a supporting surface for a loaf of dough and provided with transverse spaced knife receiving slots, a cutter mounted for movements between an upper position and a lower position having spaced knives receivable in said slots, the upper position of said cutter being above the support to permit the placing of a loaf of dough on the support beneath said cutter, the said knives and slots being arranged so the cutting knives have cutting portions which pass entirely through and beyond a loaf of dough on the support and are received in said slots entirely below the supporting surface of the support when the cutter is in lower position to permit the removal of a sliced loaf of dough from the support above said knives, means for actuating said cutter, means for lubricating said knives, including members for holding lubricant engaging said knives movable relative thereto and means for moving the same after each cutting operation.

JULIAN L. PERKINS.
HIRAM D. CROFT.